United States Patent [19]

Ergun

[11] Patent Number: 4,823,922

[45] Date of Patent: Apr. 25, 1989

[54] HEAVY DUTY VEHICULAR SHOCK ABSORBER

[75] Inventor: Joseph Ergun, Itasca, Ill.

[73] Assignee: Maremont Corporation, Carol Stream, Ill.

[21] Appl. No.: 69,304

[22] Filed: Jul. 2, 1987

[51] Int. Cl.[4] .......................... F16F 9/34; F16F 9/36; F16K 17/26

[52] U.S. Cl. ................. 188/322.15; 158/315; 158/317; 158/322.17; 158/322.14; 137/493.8

[58] Field of Search ............... 267/126, 127; 188/322.11, 322.13, 322.15, 322.17, 317, 316, 315, 314, 297; 137/493.8, 493.3, 493.4, 543.15

[56] References Cited

U.S. PATENT DOCUMENTS

| | | | |
|---|---|---|---|
| 2,384,186 | 9/1945 | Magrum et al. | 137/493.3 |
| 2,576,637 | 11/1951 | Patriquin | 137/493.8 |
| 2,603,235 | 7/1952 | Kirkham | 137/493.8 |
| 2,616,711 | 11/1952 | Whisler, Jr. et al. | 277/45 |
| 2,662,615 | 12/1953 | Armstrong | 188/100 |
| 2,719,612 | 10/1955 | Bourcier de Carbon | 188/314 |
| 2,785,774 | 3/1957 | Long et al. | 188/313 X |
| 3,194,262 | 7/1965 | Hamilton et al. | 137/493 |
| 3,203,511 | 8/1965 | Long, Jr. | 188/100 |
| 3,216,535 | 11/1965 | Schultze | 188/88 |
| 3,907,080 | 9/1975 | Chadwick | 188/322 |
| 4,036,319 | 7/1977 | Andre | 188/282 |
| 4,060,155 | 11/1977 | Duckett | 188/282 |
| 4,085,925 | 1/1978 | Peddinghause et al. | 267/64 R |
| 4,109,767 | 8/1978 | Nandyal et al. | 188/315 |
| 4,203,507 | 5/1980 | Tomita et al. | 188/317 |
| 4,325,468 | 1/1982 | Siorek | 188/282 |
| 4,360,085 | 11/1982 | Pendergast | 188/315 |
| 4,401,196 | 8/1983 | Grundei | 188/282 |
| 4,423,800 | 1/1984 | Kobiske et al. | 188/277 |
| 4,428,566 | 1/1984 | de Baan et al. | 267/64.15 |
| 4,438,834 | 3/1984 | Handke et al. | 188/322.16 |
| 4,589,528 | 5/1986 | Axthammer et al. | 188/279 |
| 4,596,321 | 6/1986 | Harper et al. | 188/322.15 |
| 4,624,346 | 11/1986 | Katz | 188/282 |
| 4,624,347 | 11/1986 | Mourray | 188/322.15 |
| 4,702,356 | 10/1987 | Katz et al. | 188/315 |

FOREIGN PATENT DOCUMENTS

| | | | |
|---|---|---|---|
| 1044537 | 11/1958 | Fed. Rep. of Germany | 137/543.15 |
| 1089099 | 3/1955 | France | 188/317 |
| 0810836 | 3/1959 | United Kingdom | 137/493.8 |

Primary Examiner—Andres Kashnikow
Assistant Examiner—Richard Potosnak
Attorney, Agent, or Firm—McAndrews, Held & Malloy, Ltd.

[57] ABSTRACT

A vehicular shock absorber is disclosed and includes a two-piece piston head, one piece being the mirror image of the other, mated by a pin. The piston head defines a series of passages. Identical valve assemblies are positioned in the passages so as to allow passage, under pressure, of hydraulic fluid in both directions between a compression chamber and a recoil chamber. Each valve assembly includes a spring clip, partially encompassing the valve bias spring so as to limit potentially damaging compression thereof. The shock absorber further includes a compression head assembly, providing fluid communication between the compression chamber, and a reservoir chamber, and a cylinder head assembly which, in part, seals about and maintains the piston rod.

3 Claims, 5 Drawing Sheets

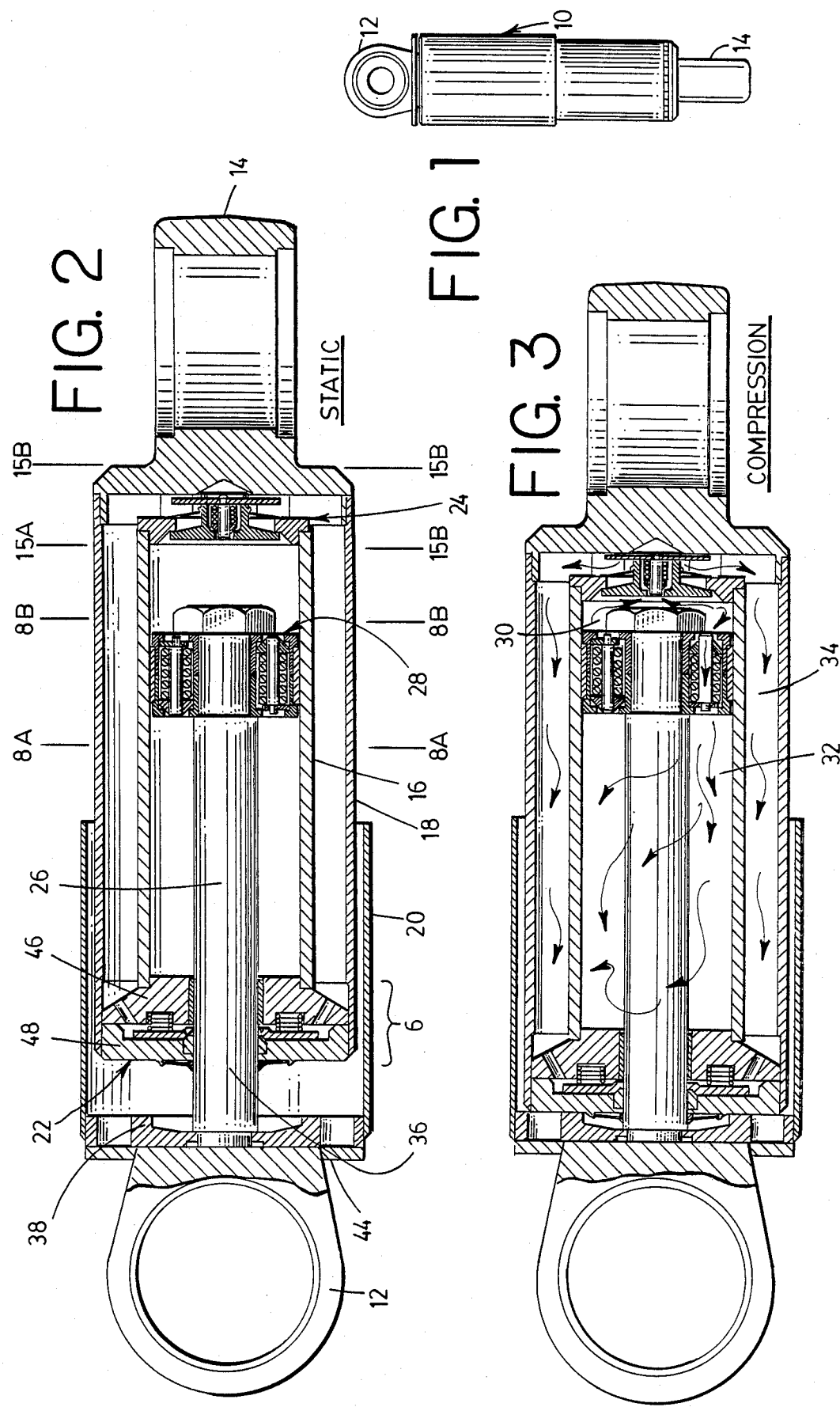

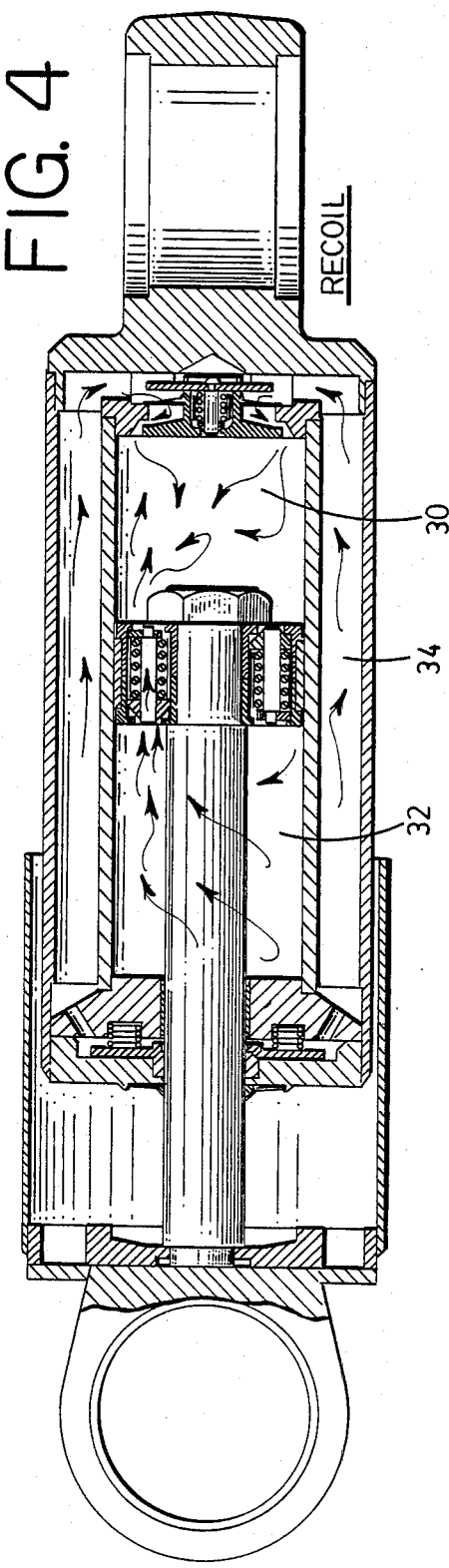
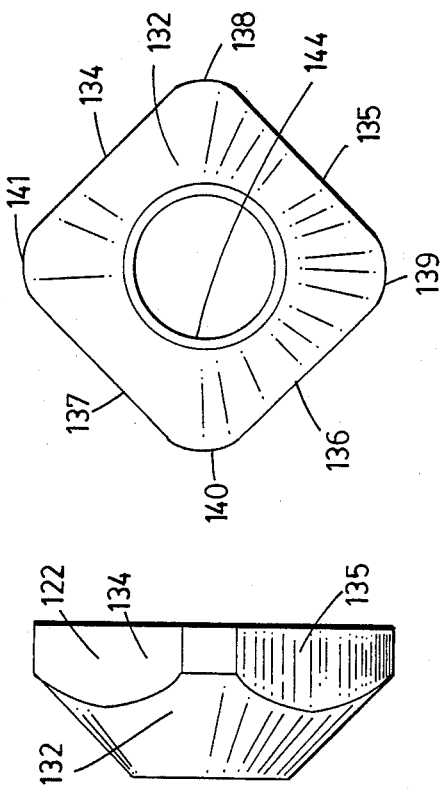
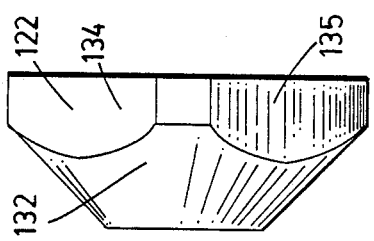
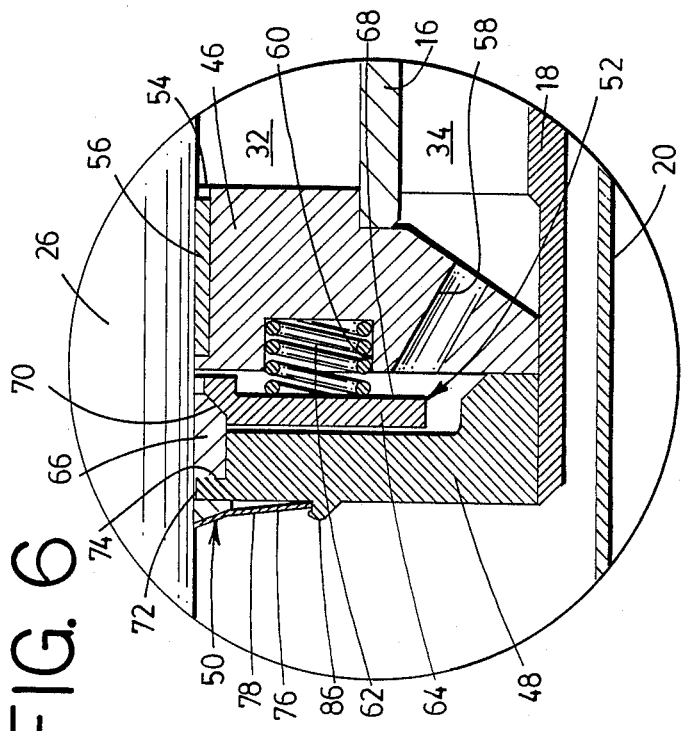

COMPRESSION

RECOIL

COMPRESSION

RECOIL

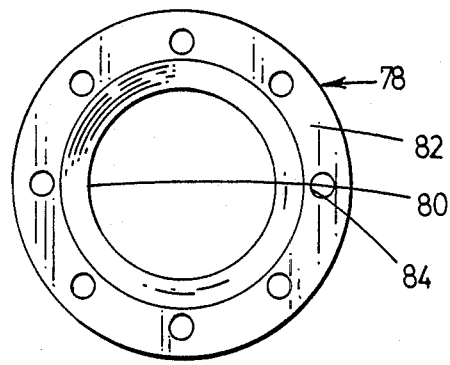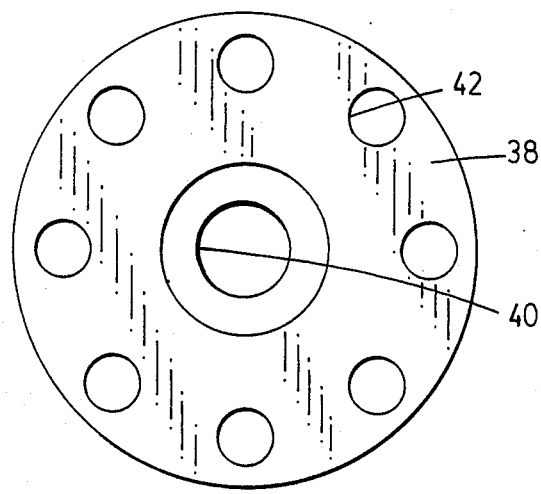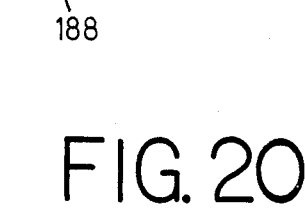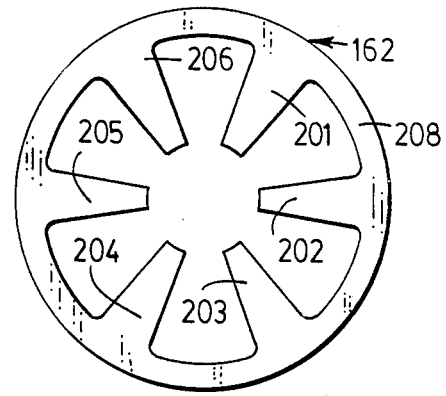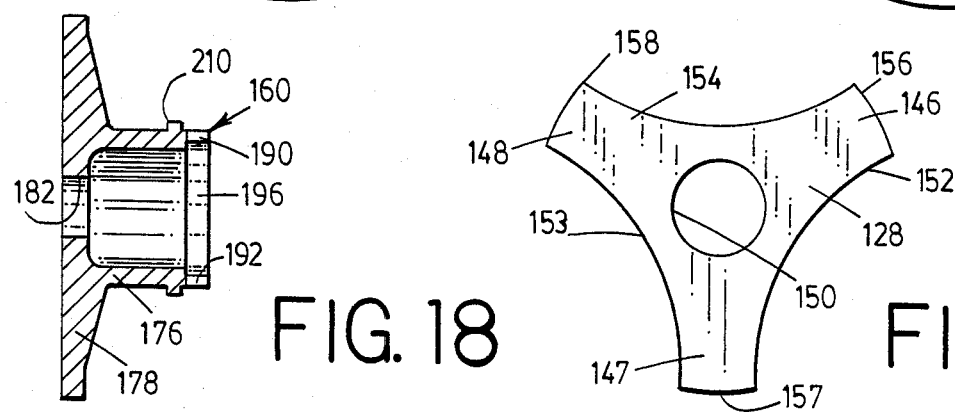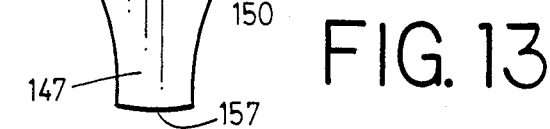

HEAVY DUTY VEHICULAR SHOCK ABSORBER

BACKGROUND OF THE INVENTION

This invention relates to vehicular shock absorbers.

An object of the invention was to provide a vehicular shock absorber capable of large damping forces (of ten thousand pounds and more) for extended periods of time without major maintenance, which was also capable of operating at temperature extremes of +625° F. to −65° F. and economical to fabricate.

In a first principal aspect, the invention comprises a shock absorber having a unique piston. The piston body is formed by assembling two piston halves which are identical components. The halves are assembled back-to-back along the piston rod.

Each piston half defines a plurality of internal piston valve passage halves. At least alternating passage halves of each piston half include piston valve seats. The piston halves are assembled to pair the passage halves of one piston half with the passage halves of the other piston half, to form complete passages.

If alternating passage halves include seats, then each passage half having a seat is paired with a passage half lacking a seat. Thus, each complete passage has at least one valve seat. The locations of the valve seats at least alternate, such that a first complete passage has a valve seat along at least the compression chamber face of the piston, and the next complete passage has a valve seat along at least the opposite, recoil chamber face of the piston.

Rebound and compression valve assemblies are located in the piston passages. The rebound and compression valve assemblies are geometrically identical. Only their directions are reversed.

The piston as described is capable of extended use under severe conditions and is economical of fabrication.

In another principal aspect, the invention comprises a shock absorber having a unique compression head assembly. The compression head defines a replenishing valve passage in which a replenishing valve moves, toward and away from a replenishing valve seat. An annular finger spring located exteriorly to the compression head guides the travel of the replenishing valve and bias the valve to the closed position. Arms attached to the replenishing valve limit the extent of travel of the valve. A compression valve assembly similar to the piston valve assemblies is located centrally in the replenishing valve.

These and other objects, aspects and advantages of the invention are best understood through a reading of the detailed description of the invention, which follows a brief description of the drawing.

BRIEF DESCRIPTION OF THE DRAWING

The preferred embodiment of the present invention will be described in relation to the accompanying drawing. The drawing consists of twenty-two figures or views, as follows:

FIG. 1 (sheet 1) is a reduced size, external elevation view of the preferred embodiment of the invention;

FIG. 2 (sheet 1) is a central section view of the preferred embodiment of the invention, in a static state, with eye ring bearings deleted;

FIG. 3 (sheet 1) is a central section view of the preferred embodiment of the invention, as moving on a compression stroke;

FIG. 4 (sheet 2) is a central section view of the preferred embodiment of the invention as moving on a recoil stroke;

FIG. 5 (sheet 4) is a plan view of a dust tube cap of the preferred embodiment;

FIG. 6 (sheet 2) is a static detail view of the head structure of the inner and intermediate cylinders taken in the area 6 of FIG. 2;

FIG. 7 (sheet 4) is a plan view of a rod scraper retainer of the preferred embodiment;

FIG. 11 (sheet 2) is a side elevation view of a valve head of the piston valve structure;

FIG. 12 (sheet 2) is a plan view of the valve head of the piston valve structure;

FIG. 13 (sheet 4) is a plan view of the valve plate of the preferred embodiment;

FIG. 14 (sheet 4) is a partially cutaway plan view of a possible modification of a piston valve pin of the preferred embodiment;

FIG. 18 (sheet 4) is a central cross-section view of a replenishing valve of the base valve structure of the preferred shock absorber;

FIG. 19 (sheet 4) is a plan view of a retainer plate of the base valve structure of the preferred shock absorber;

FIG. 20 (sheet 4) is a plan view of a replenishing spring of the base valve structure of the preferred shock absorber;

Figure 15:
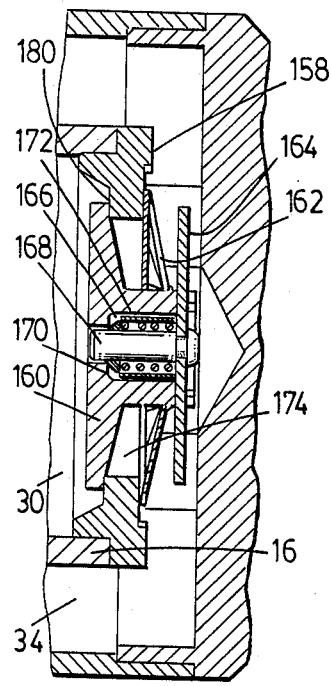
FIG. 15 (sheet 3) is a detail view of the base valve structure of the preferred shock absorber, taken in the area between lines 15A, 15B in FIG. 2, in static condition.

In the foregoing and in the detailed description of the preferred embodiment, reference is made to directions such as "upper" and "lower". Except to the extent expressly included in the claims, these references are intended solely as an aid to the reader.

DETAILED DESCRIPTION OF THE PREFERRED EMBODIMENT

Referring to FIG. 1, the preferred embodiment of the invention is a vehicular shock absorber 10. A pair of end mounts 12, 14 join the shock absorber 10 to a vehicle, between the vehicle body and a wheel assembly. The shock absorber 10 absorbs shocks caused by the travel of the wheel assembly over uneven surfaces.

Referring to FIGS. 2-4, shocks are absorbed within the shock absorber 10 by restricted flow of a hydraulic fluid, designated by arrows in FIGS. 3 and 4. Flow occurs through valving which regulates the flow, into and out of several fluid chambers. As the distance between end mounts 12, 14 decreases due to shocks to a wheel assembly, the shock absorber is in compression, with flow as in FIG. 3. As the distance between end mounts increases, the shock absorber is in recoil, with flow as in FIG. 4.

Referring to FIG. 2, the shock absorber includes an inner cylinder 16, an intermediate cylinder 18, and an outer cylinder 20; a cylinder head assembly 22 and a compression head assembly 24; a piston rod 26 and a piston assembly 28. The inner cylinder 16, intermediate cylinder 18, cylinder head assembly 22 and compression head assembly 24 are secured together to the end mount 14. The piston rod 26, piston assembly 28 and outer cylinder 20 are secured together to the end mount 12. As seen by comparing FIGS. 2, 3 and 4, the cylinders 16, 18 and assemblies 22, 24 move relative to the piston rod 26, assembly 28 and cylinder 20, and vice-versa.

The piston assembly 28 includes valving, as does the compression head assembly 24. During compression, as in FIG. 3, hydraulic fluid flows from a compression chamber 30 through the piston valving to a recoil chamber 32, and through the compression head valving to a reservoir 34. The compression chamber 30 and recoil chamber 32 are variable volume chambers. The compression chamber 30 is defined within the inner cylinder 16, between the compression head assembly 24 and the piston assembly 28. The recoil chamber is also defined within the inner cylinder 16, between the inner cylinder head 46 and the piston assembly 28. During compression, the compression chamber 30 decreases in volume, as the recoil chamber 32 increases.

During recoil, as in FIG. 4, flow is reversed. Flow is into the compression chamber 30 from the recoil chamber 32 and reservoir 34. The recoil chamber 32 is decreasing in volume, as the compression chamber 30 is increasing in volume.

The reservoir 34 is a fixed volume chamber, located between the intermediate cylinder 18 and the inner cylinder 16. A gas occupies a portion of the reservoir 34. The gas is compressible, and allows a changing volume of hydraulic fluid to occupy the reservoir, with little resistance to the change.

As shown especially in FIG. 2, the outer cylinder 20 serves as a cover. The outer cylinder 20 covers and protects the highly polished piston rod 26 from grime as a piston rod portion 36 exits the inner cylinder 16 during long excursions of the shock absorber 10, i.e., during wide separation of the end mounts 12, 14. The outer cylinder 20 is annular, larger in diameter than the intermediate cylinder 18, and fitted loosely over a portion of the intermediate cylinder 18. A cap 38 joins the outer cylinder 20 to the piston rod portion 36 immediately adjacent the end mount 12.

Referring to FIG. 5 (sheet 4), the cap 38 is an annular disk. A central opening 40 fits the piston rod portion 36. A plurality of non-central openings such as 42 are circumferentially spaced around the central opening 40. The openings such as 42 permit expulsion of any debris from within the outer cylinder 20. Referring to FIG. 2, an elastomeric (rubber) baffle 44 extends over the openings 42 outside the cap 38. The baffle 44 flexes to permit debris expulsion, and otherwise guards the openings 42 against debris intrusion.

Referring to FIGS. 2 and 6, the cylinder head assembly 22 includes an inner cylinder head ("inner head") 46, an intermediate cylinder head ("intermediate head") 48, a rod scraper assembly 50 and a rod seal assembly 52. The inner head 46 surmounts the inner cylinder 16; the intermediate head 48 surmounts the intermediate cylinder 18.

The inner head 46 is annular. A central opening 54 receives a guide bushing 56 for the piston rod 26. One or more drain passages 58 provide fluid communication between the outer face of the head 46 and the reservoir 34. Any hydraulic fluid exiting the recoil chamber 32 past the guide bushing 56 is drained into the reservoir 34.

Referring to FIG. 6 for detail, a plurality of spring recesses 60 are spaced circumferentially around the central opening 54 of the inner head 46. Coil springs 62 fit within the recesses 60. The spring 62 press outward, against a seal retainer 64. The seal retainer 64 transmits force of the springs 62 to a rod seal 66. More particularly, the springs 62 press against an outer disk face 68 of the seal retainer 64. An angled, inner, annular seal face 70 of the seal retainer 64 transmits force longitudinally and inwardly to a mating face of the rod seal 66. The annular rod seal 66 is compressed against the piston rod 26, for an effective seal.

The intermediate head 48 surmounts the intermediate cylinder 18 and the inner head 46. The intermediate head 48 is annular, with a central opening 72 for the piston rod 26. An annular recess 74 along the central opening 72 receives the rod seal 66.

The rod scraper assembly 50 surmounts the intermediate head 48. A rod scraper 76 is held by a rod scraper retainer 78 against the piston rod 26 and intermediate head 48. Referring to FIG. 7 (sheet 4), the retainer 78 is annular, with a central, piston rod opening 80. An outer, annular flange portion 82 defines a plurality of openings 84 arranged to provide greater flexibility of the disc and increase the deflection load ratio. Referring again to FIG. 6, an annular ring 86 of the intermediate head 48 is coined to hold the retainer 78 to the head 48.

The rod scraper 76 is formed of Koppers K-30T, a bronze filled PTFE or similar material, spring quality sheet material finished and heat treated. The rod scraper 76 is annular, and trapezoidal in cross-section. The scraper 76 prevents contaminants from entering the shock absorber interior and is capable of operating at the temperature extremes encounted by the unit.

Attention is now directed to the piston assembly 28, as in FIGS. 8-14 and 20-21. Piston rod 26 is elongated, and defines an axial direction in the direction of its elongation. The piston assembly 28 is formed, in part, of two piston body halves 90, 92. The two halves 90, 92 are formed separately, and held in assembly to abut each other axially, with the angular register of the two body halves determined by the locating pin 95 which is received by locating pin hole 97 formed into piston face 98.

Figure 8:
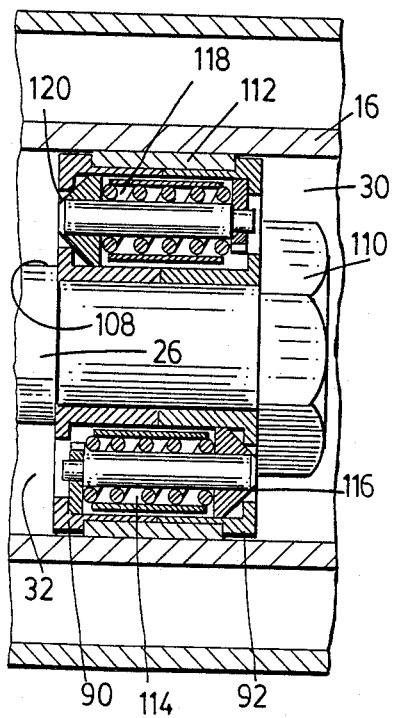
FIG. 8 (sheet 3) is a detail view of the piston and piston valving structure of the preferred shock absorber, taken in the area between lines 8A and 8B of FIG. 2, in static condition.

Referring to FIG. 8, the two halves 90, 92 are, in assembled position, mirror images of each other. In fact, the two halves 90, 92 are identical to each other, in structure. Half 92 is merely turned 180°, or positioned in reverse, to half 90.

Figure 21:
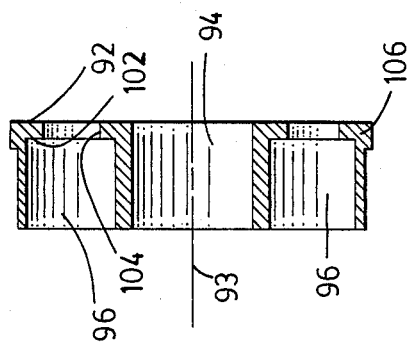
FIG. 21 (sheet 5) is a cross-section view, as in FIGS. 8-10, of a valve body half of the valve of the preferred shock absorber.
Figure 22:
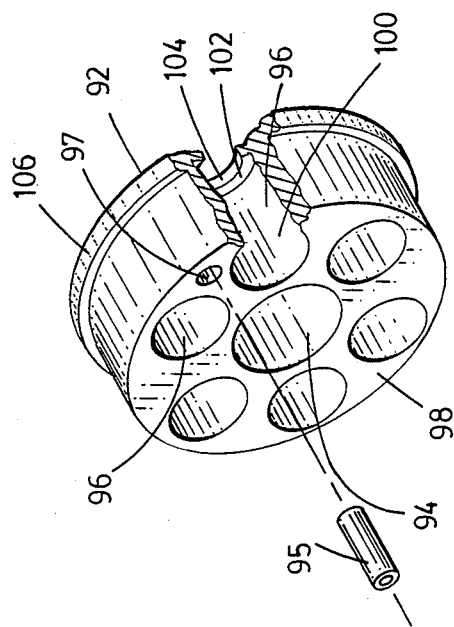
FIG. 22 (sheet 5) is a perspective view of the valve body half, with a portion broken away to reveal valve recess detail.

More particularly and referring to FIGS. 21 and 22, each half 90, 92, such as half 92, is annular about a central axis 93, with a central piston rod opening 94. A plurality of valve recesses 96 are circumferentially spaced around the central opening 94. The valve recesses 96 are equally spaced circumferentially. Each valve recess begins along a flat, transverse, central face 98 of the half, and extends in a uniform diameter, major portion 100 axially within the half. Each recess terminates in an annular rim 102, within which a reduced diameter opening 104 is formed. Externally, each half includes an external, annular shoulder 106, opposite the central face 98. The shoulder 106 has an enlarged outer diameter.

Referring again to FIG. 8, the halves 90, 92 are assembled with central faces 98 in contact, and with valve locating pin 95 in recess 97 of the half 90 aligned circumferentially with the locating pin 97 of the half 92. The halves are held against a shoulder 108 of the piston rod 26, by mechanical fastener, such as a nut 110 threaded on the end of the piston rod 26.

An annular temperature resistant wear band 112 encircles the halves 90, 92 and is held between the shoulders 106 of the halves 90, 92. The wear band 112 extends outward of the shoulders 106, to contact the inner wall of the inner cylinder 16.

In the embodiment illustrated, three valve recesses 96 and three cylindrical cavities are alternately formed in each piston half 90, 92. Together these recesses form six piston valve chambers. Three piston valve chambers, such as chamber 114, in FIG. 8, are occupied by piston compression valves such as valve 116. Three piston valve chambers, such as chamber 118, are occupied by piston recoil valves, such as valve 120, as in FIG. 8. No fluid flows through the piston assembly 28 when the shock absorber is static. Fluid does flow through the piston compression valves when the shock absorber is in compression, as in FIG. 9. Fluid flows through the piston recoil valves when the shock absorber is in recoil, as in FIG. 10.

Figure 9:
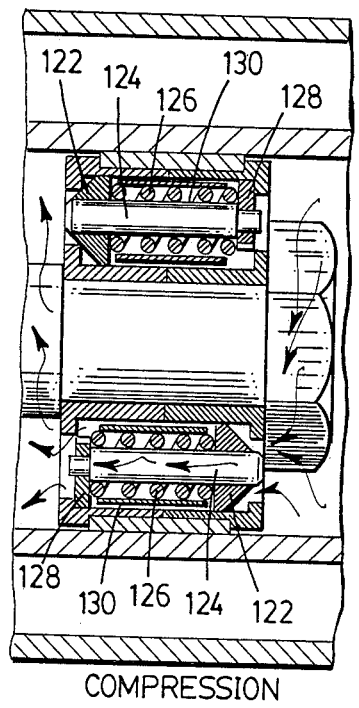
FIG. 9 (sheet 3) is a detail view of the piston and piston valving structure of the preferred shock absorber, similar to FIG. 8, during compression, as in FIG. 3.

Referring to FIG. 9, each piston compression valve 116 and each piston recoil valve 120 includes a valve head 122, a valve pin 124, a valve spring 126, a valve plate 128 and a valve spring clip 130. All the valve heads, valve plates and valve spring clips are identical. Valve springs and pins can be modified to effect the desire damping characteristics.

Referring to FIGS. 11 and 12 (sheet 2), each valve head includes a frusto-conical valve face 132 terminating in four sidewalls 134, 135, 136, 137. The sidewalls are at right angles to each other, such that in plan view, as in FIG. 12, the valve head is generally square. Corners of the valve head at the intersections of the sidewalls 134-137 are rounded, forming segments 138-141 of an annulus centered among the sidewalls and having a diameter substantially equal to the diameter of the piston valve recesses 96. Thus, the valve heads 122 are slidable within the piston valve chambers, with the annulus segments 138-142 in sliding contact with the piston along the chambers, and with flow occurring past the sidewalls 134-137.

Figure 10:
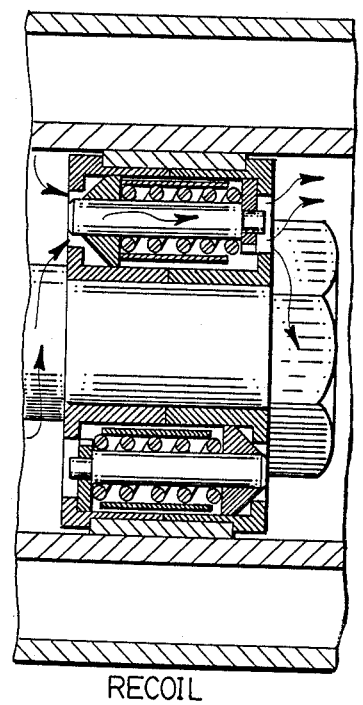
FIG. 10 (sheet 3) is a detail view of the piston and piston valving structure of the preferred shock absorber, similar to FIG. 8, during recoil, as in FIG. 4.

Each valve head 122 also includes a central, valve pin opening 144. Referring to FIGS. 8-10, the valve heads 122 slide along the valve pins 124. In the piston compression valves, the valve heads 122 face the compression chamber 30. The valve heads 122 of the piston recoil valves face the recoil chamber 32. The valve faces 132 contact the annular rims 102, when static.

The valve pins 124 are held in position centrally within the piston valve chambers by the valve plates 128. Referring to FIG. 13 (sheet 4), each valve plate 128 includes three arms 146-148 spaced at equal angles (120°) about a central opening 150. The sidewalls 152-154 of the arms 146-148 are formed along arcs with centers equidistant from and at equal angles about, the opening 150. The extremities 156-158 of the arms form segments of a circle centered on the opening 150 with a diameter substantially equal to the diameter of the piston valve chambers.

The valve plates 128 fit within the piston valve chambers. The valve pins 124 are secured to the valve plates 128 by staking. The valve springs 126 fit around the valve pins 124, between the valve plates 128 and the valve heads 122. The valve spring clips 130, which are thin annular members, fit about the valve springs 126.

In compression, fluid pressure within the compression chamber acts on the valve heads 122 of the piston compression valves 116. A pressure difference exists such that pressure is greater from the compression chamber. The pressure gradient overcomes the spring force of the valve spring 126 in the piston compression valve, sliding the valve head 122 along the valve pin 124 and the wall of the valve chamber away from seating of the valve head 122. Fluid flows past the valve head 122, past the valve spring 126 and clip 130, and through the openings among the arms 146-148 of the valve plate 128.

Also in compression, fluid pressure acts on the valve heads 122 of the piston recoil valves 120. However, with these valves reversed in direction in comparison to the piston compression valves 116, the fluid pressure of the compression chamber from within the valve chamber 118 on the back of the valve heads 122. The valve heads are forced into and maintained in contact with the valve seats adjacent the valve head 122. The piston recoil valves 118 are closed.

In recoil, the reverse occurs. The piston compression valves 116 are closed. The piston recoil valves 120 are opened.

The structure of the piston assembly 28 is advantageous in its interchangeability of components. The split piston, i.e., the piston formed of two halves 90, 92, provides an ease of assembly, whether manual or automatic. Valve components are easily assembled and located in the valve halves.

The valve spring clips 130 serve dual functions. First, the clips provide a stabilizing and damping force for the valve springs 136, thereby preventing undesirable hydraulic chirping noises. The clips 130 also limit the travel of valve heads 122, thereby preventing severe compression of and high stresses in the springs 136. The clips 130 are formed of 17-7 high temperature stainless steel, in condition 'A' (annealed), precipitation hardened to a minimum tensile strength of 210,000 psi and a minimum hardness of 43 Rockwell C.

If low speed damping is of concern, one of the valve pins may define a non-valved low speed damping passage 156, as in FIG. 14. The passage 156 circumvents the valve head 122, providing an open passage between the compression and recoil chambers. This open passage causes a first, low speed stage of damping in both compression and recoil.

Attention is now directed to the compression head assembly 24, as in FIGS. 15-20. Referring to FIG. 15, the assembly 24 includes a compression head 158, a replenishing valve 160, a replenishing spring 162, a valve retainer 164, a compression valve head 166, a compression valve pin 168, a compression valve spring 170 and a compression valve spring clip 172.

The compression head 158 is press fitted within and sealed to the inner cylinder 16. A large, central opening 174 defined in the compression head 158 forms a replenishing opening (also 174) between the compression chamber 30 and the reservoir 34. Referring to FIGS. 15 and 18, the replenishing valve 160 includes a central stem 176 and an outwardly tapering, annular flange 178. The diameter of the flange 178 exceeds the diameter of the replenishing opening 174, as in FIG. 15. The stem 176 is within the opening 174. The flange 178 seats against an annular rim 180 of the compression head which is adjacent the opening 174 and defines the end of the compression chamber 30.

Figure 16:
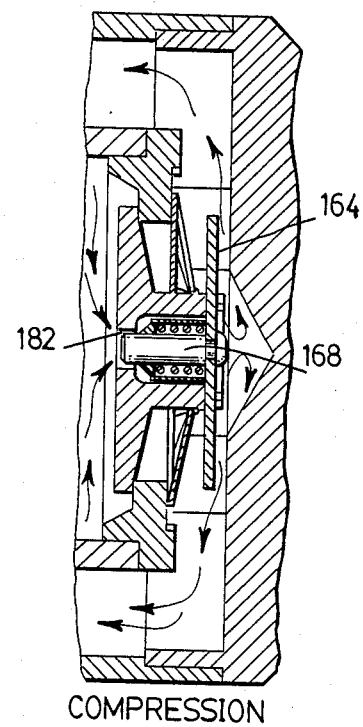
FIG. 16 (sheet 3) is a detail view of the base valve structure of the preferred shock absorber, similar to FIG. 15, during compression, as in FIG. 3.

Referring to FIGS. 16 and 18, a compression valve passage 182 is defined centrally within the replenishing valve 160, through the flange 178 and stem 176. The compression valve pin 168, head 166, spring 170 and clip 172 lie within the compression valve passage 182. The pin 168 extends from within a reduced diameter portion of the passage 182, which is within the flange 178, through a larger diameter portion of the passage 182, which extends through the stem 176.

The compression valve head 166, a smaller version of the piston valve heads 122, slides along the pin 168 and wall of the larger diameter portion of the passage 182. A frusto-conical valve face of the valve head 166 seats against a shoulder formed at the juncture of the reduced and larger diameter portions of the compression valve passage 182. The spring 170 and clip 172 are located and function relative to the pin 168 and head 166 as the spring 126 and clip 130 are located and function relative to the pin 124 and head 122.

The valve retainer 164 holds the valve pin 168 centrally within the passage 182. The valve retainer also serves other functions. Referring to FIG. 19, the valve retainer 164 is unlike the valve plate 128. The valve retainer 164 includes a central, circular plate 184 having an outer diameter substantially equal to the diameter of a largest diameter portion of the passage 182. Two arms 186, 188 project from the plate 184. Each arm 186, 188 has a length from the plate 184 to the end of the arm substantially equal to the diameter of the plate. As in FIGS. 15–17, the arms extend from the plate 184 into the base of the reservoir 34. As in FIG. 18, the replenishing valve 160 has slots 190, 192 adjacent the largest diameter portion 196 of the passage 182. The arms 186, 188 extend through the slots 190, 192.

The valve retainer 164 is secured to the valve pin 168. The pin 168 is fitted within a central opening 198 of the valve retainer plate 184, and struck to form a head which holds the plate 184. Circumferentially spaced, noncentral openings 200 ring the plate 184, providing flow through the plate.

Figure 17:
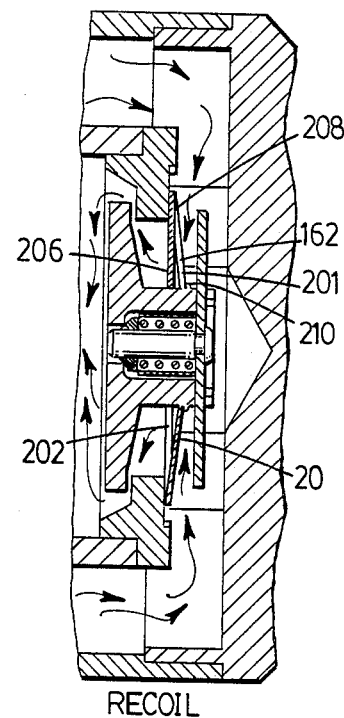
FIG. 17 (sheet 3) is a detail view of the base valve structure of the preferred shock absorber, similar to FIG. 15, during recoil, as in FIG. 4.

Flow is as designated in FIGS. 16 and 17. The arms 186, 188 limit total upward movement of the replenishing valve 160 during replenishing of fluid as shown in FIG. 17.

Referring to FIGS. 17 and 20, the replenishing spring 162 is an annular finger spring. Six fingers 201–206 project inwardly from a circular outer rim 208. The fingers 201–206 are equally spaced circumferentially. Alternating fingers 201, 203, 205 are angled from the plane of the rim; remaining fingers 202, 204, 206 are in the plane of the rim.

Referring to FIG. 17, the replenishing spring 162 is in the base of the reservoir 34. The rim 208 is biased toward and contacts the lower annular surface 163 of the compression head 158. The fingers 202, 204 and 206 contact and slide along the exterior of the stem 176, between the juncture of the stem with the flange, and a raised circular stop 210, and thus position the replenishing valve 160 in the compression head 158. The end portion of fingers 201, 203, and 205 are biased to contact the upper surface of ring stop 210 and return the replenishing valve 160 to static position after recoil flow has moved the valve 160 and lifted the flange 178 off the rim 180.

The preferred embodiment and the invention are now described in such full, clear, concise and exact terms as to enable a person of skill in the art to make and use the same. To particularly point out and distinctly claim the subject matter regarded as invention, the following claims conclude this specification.

What is claimed is:

1. A vehicular shock absorber including a hydraulic fluid comprising, in combination:

an inner cylinder having a first inner open end and a second inner open end;

an intermediate cylinder having an intermediate open end and an intermediate closed end, said intermediate cylinder being adapted to receive said inner cylinder;

an outer cylinder having an outer open end and an outer closed end, said outer cylinder being adapted to receive said intermediate open end of said intermediate cylinder;

a cylinder head assembly secured to said first inner open end and said intermediate open end, said cylinder head assembly defining a piston rod passageway and including a rod scraper assembly;

a compression head assembly secured to said second inner open end; and a piston including a piston assembly adapted to slide within said inner cylinder and a piston rod secured to said piston assembly and said outer closed end, said piston rod passing through said piston rod passageway;

said inner cylinder, intermediate cylinder, cylinder head assembly, compression head assembly, and piston assembly cooperating to define a compression chamber, a recoil chamber and a reservoir;

said piston assembly including two identical piston body halves, abutted and secured to said piston rod in mirror image so as to define a series of identical valve openings, and a series of identically dimensionally configured valve assemblies positioned within said valve openings, a first series of said valve assemblies passing said hydraulic fluid under pressure from said recoil chamber to said compression chamber, a second series of valve assemblies passing said hydraulic fluid under pressure from said compression chamber to said recoil chamber, each of said two identical piston body halves including an alignment opening;

said rod scraper assembly engaging said piston rod to remove debris therefrom;

said piston assembly further including a pin adapted to engage said alignment openings so as to facilitate assembly of said two identical piston body halves;

said compression head assembly including two-way valve means for passing said hydraulic fluid between said compression chamber to said reservoir.

2. A vehicular shock absorber as claimed in claim 1 wherein each of said valve assemblies includes a bias spring and a spring clip partially encompassing said bias spring to limit compression thereof and to substantially avoid hydraulic chirping.

3. A vehicular shock absorber as claimed in claim 2 wherein each of said two identical piston body halves includes an outwardly extending collar, said piston assembly further including a wear-resistant band encompassing said two identical piston body halves between said outwardly extending collars.

* * * * *